United States Patent [19]
Waskiewicz

[11] Patent Number: 5,909,880
[45] Date of Patent: Jun. 8, 1999

[54] POLYMER BEARING SEAL AND SEALED BEARING

[75] Inventor: Walter P. Waskiewicz, Bristol, Conn.

[73] Assignee: The Torrington Company, Torrington, Conn.

[21] Appl. No.: 08/803,212

[22] Filed: Feb. 21, 1997

[51] Int. Cl.⁶ ........................................... F16J 15/32
[52] U.S. Cl. ........................................ 277/561; 277/562
[58] Field of Search .......................... 384/486, 488; 277/551, 553, 556, 560, 561, 562, 572, 586

[56] References Cited

U.S. PATENT DOCUMENTS

| | | | |
|---|---|---|---|
| 3,388,638 | 6/1968 | Brinkel | 277/560 X |
| 3,623,738 | 11/1971 | MacDonnell | 277/561 X |
| 3,700,296 | 10/1972 | Bugmann | 277/551 |
| 4,428,629 | 1/1984 | Colanzi et al. | 384/485 |
| 4,611,931 | 9/1986 | Brandenstein et al. | 277/561 X |
| 4,733,978 | 3/1988 | Colanzi et al. | 277/375 |
| 4,805,919 | 2/1989 | Wiblyi et al. | 277/560 |
| 5,037,213 | 8/1991 | Uchida et al. | 384/482 |
| 5,137,285 | 8/1992 | Pick | 277/562 X |
| 5,333,957 | 8/1994 | Yip et al. | 384/484 |

FOREIGN PATENT DOCUMENTS

| | | | |
|---|---|---|---|
| 2644858 | 9/1990 | France | 384/486 |

*Primary Examiner*—Eric K Nicholson
*Assistant Examiner*—Greg Binda
*Attorney, Agent, or Firm*—John C. Bigler

[57] ABSTRACT

A polymer ring has a circumferential mounting flange and an annular end wall extending radially inwardly and axially inwardly therefrom, providing a conically convex side and a conically concave side. An annular seal lip projects from a radially inner portion of the end wall to engage an annular radially outwardly curved surface of the bearing inner ring after insertion of the seal into the bearing. An annular rib located on the convex side between the end wall and the mounting flange, and an annular rib groove on the concave side opposite the annular rib, allow the polymer ring to collapse radially as the end wall is deflected axially outwardly to a more radial orientation during insertion.

22 Claims, 2 Drawing Sheets

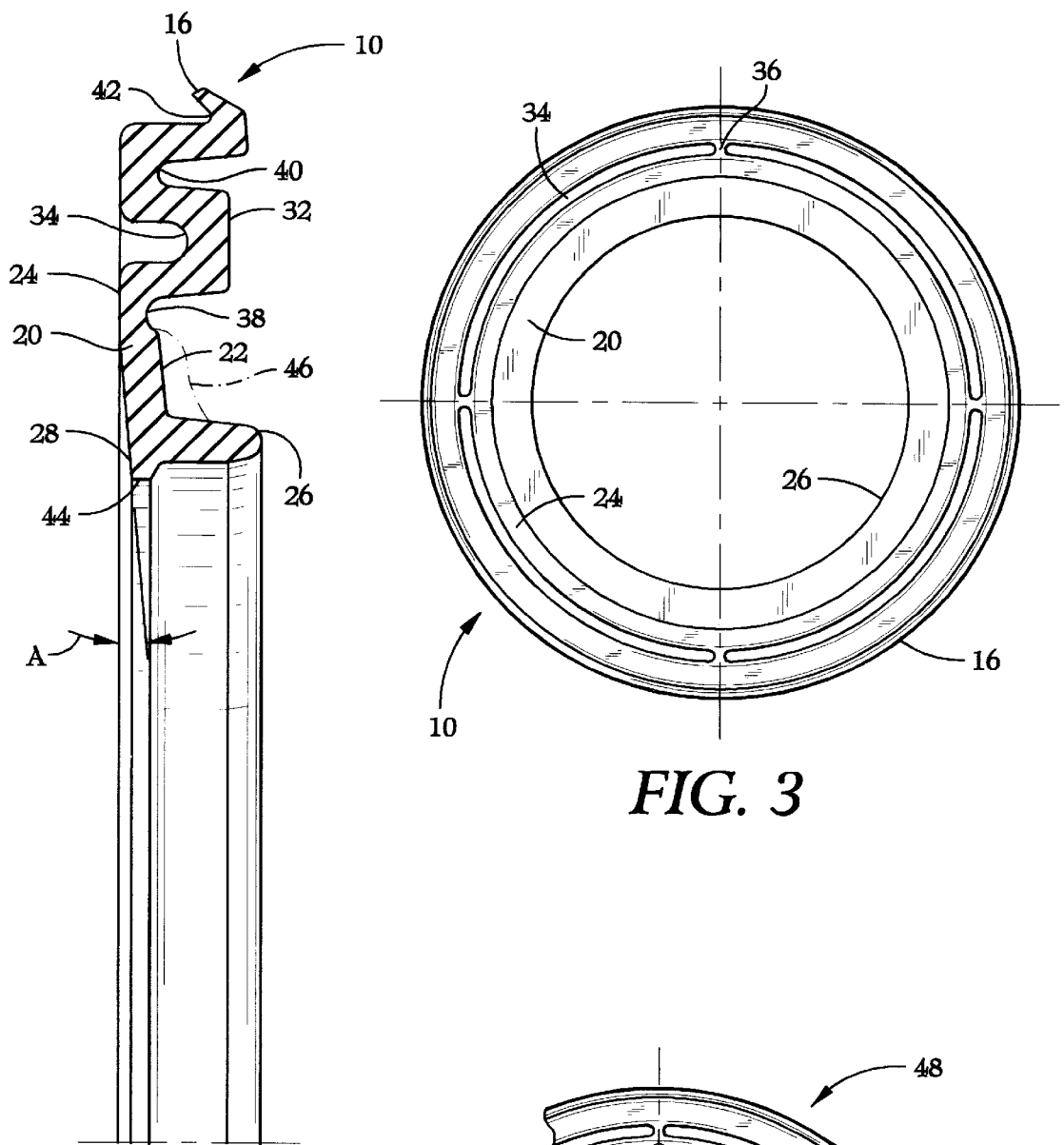
FIG. 2
FIG. 3
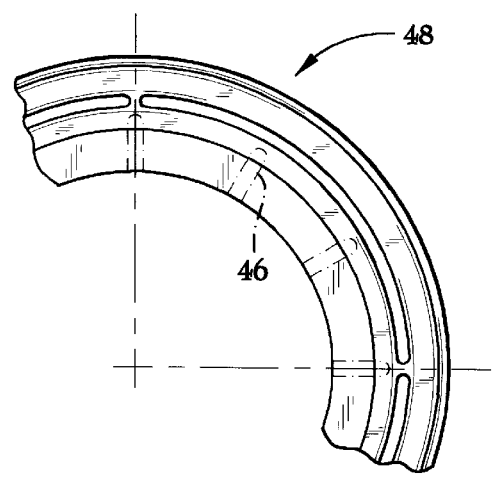
FIG. 4

POLYMER BEARING SEAL AND SEALED BEARING

BACKGROUND OF THE INVENTION

This invention relates generally to bearing seals for use in sealed bearings with rolling elements and, more particularly, to a bearing seal made of polymer.

Typically, bearing seals are mounted on a bearing outer ring and have a flexible lip extending to a bearing inner ring. Conventional bearing seals are made of synthetic rubber molded around metal washer support inserts. This construction and fabrication method results in relatively costly bearing seals, increasing the cost of the sealed bearing.

Various alternative bearing seals have been proposed, to be made of a stiff, homogeneous material such as, for example, a fiber-reinforced thermoplastic. However, due to manufacturing tolerances and differences in rates of expansion between such seals and the bearing inner and outer rings, such seals fail to seal effectively when the sealed bearing undergoes a wide range of temperature.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a polymer bearing seal comprising a polymer ring having a circumferential mounting flange for engagement with a seal groove of a bearing outer ring. An annular end wall extends radially inwardly and axially inwardly, providing a conically convex side and a conically concave side. An annular first seal lip projects from a radially inner portion of the end wall to engage an annular radially outwardly curved surface of the bearing inner ring after insertion of the seal into the bearing. An annular rib located on the convex side between the end wall and the mounting flange, and an annular rib groove on the concave side opposite the annular rib, allow the polymer ring to collapse radially as the end wall is deflected axially outwardly to a more radial orientation during insertion.

In another aspect of the invention, this is accomplished by providing a sealed bearing with a polymer bearing seal.

The foregoing and other aspects will become apparent from the following detailed description of the invention when considered in conjunction with the accompanying drawing figures.

BRIEF DESCRIPTION OF THE DRAWING FIGURES

FIG. 2 is a cross sectional view of a polymer bearing seal prior to insertion into a sealed bearing, illustrating an alternative embodiment of the present invention similar to the seal illustrated in FIG. 1 but including optional radial ribs;

FIG. 3 is an axial end view of the polymer bearing seal of FIG. 1; and

FIG. 4 is the axial end view of a portion of an alternative embodiment of the polymer bearing seal of FIG. 2.

DETAILED DESCRIPTION

Figure 1:
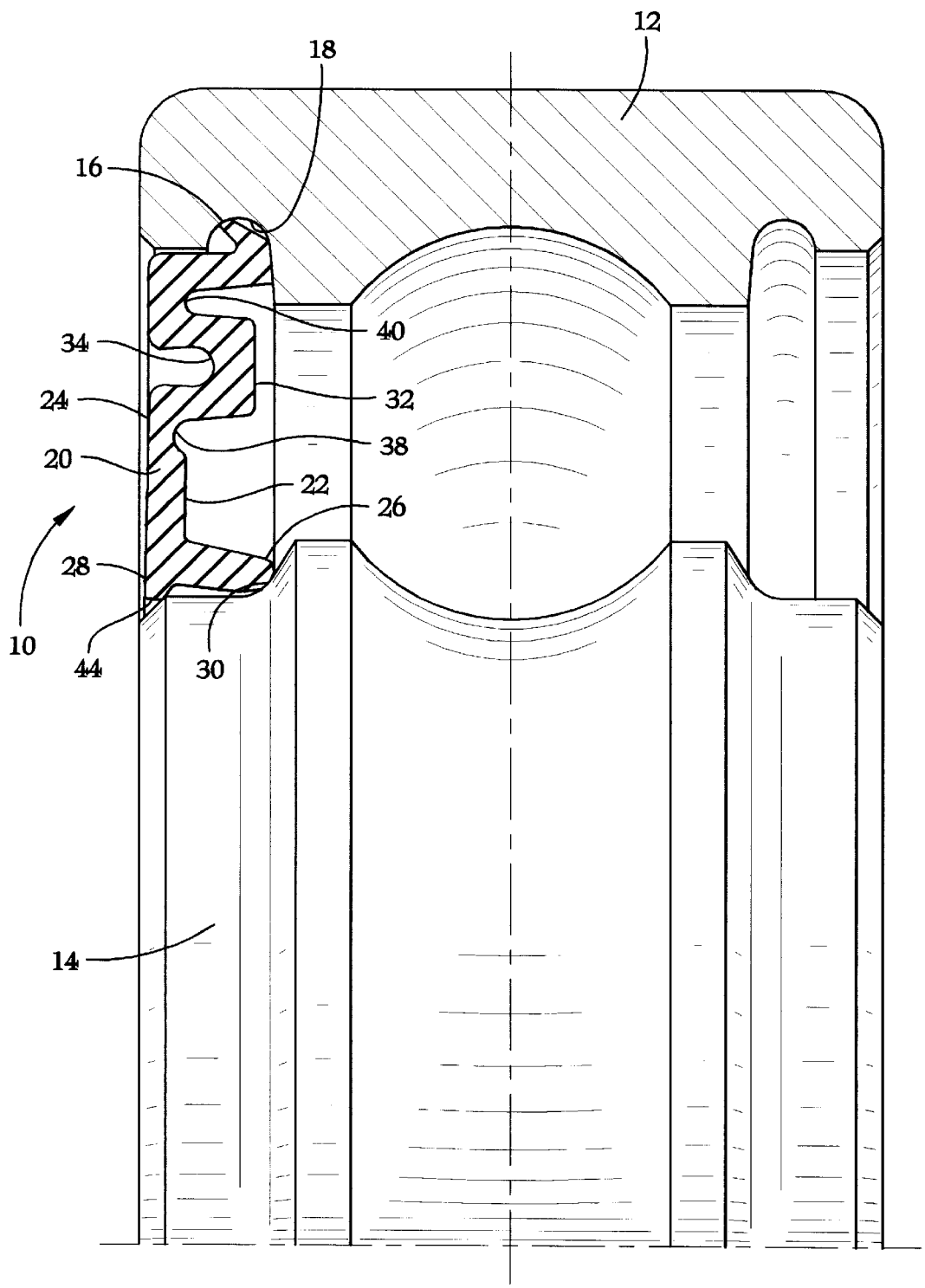
FIG. 1 is a cross sectional view illustrating an embodiment of the sealed bearing of the present invention.

Referring now to the drawings, FIGS. 1 through 3 illustrate polymer bearing seal 10 of the present invention, both after and before insertion between bearing outer ring 12 and bearing inner ring 14. Seal 10 comprises a polymer ring having mounting flange 16 along the polymer ring's outer circumference for mounting engagement with seal groove 18 of bearing outer ring 12.

Prior to insertion into a bearing, as illustrated in FIG. 2, the polymer ring has annular end wall 20 extending radially inwardly and axially inwardly from mounting flange 16 to provide conically concave side 22 to be directed toward an axial center of the bearing and a conically convex side 24 to be directed away from the axial center of the bearing. Angle "A" prior to insertion in the bearing is dependent upon the size of the bearing, a larger angle being desirable as the size of the bearing increases. For example, for bearings with an outer ring diameter increasing from 1.5 inches to 5 inches, angle "A" would typically increase from approximately 7 degrees to 15 degrees.

The polymer ring has annular first seal lip 26 projecting from radially inner portion 28 of end wall 20 for engagement with annular radially outwardly curved surface 30 of bearing inner ring 14. Curved surface 30 may be a radiused surface on a shoulder of bearing inner ring 14, as shown, with a concave circular cross-section, or may be otherwise curved to provide a smooth concave cross-section. This configuration allows first seal lip 26 to travel up and down curved surface 30 to accommodate manufacturing tolerances, thermal expansion differences between polymer bearing seal 10 and bearing inner and outer rings 12 and 14, and aging and wear of those components.

The polymer ring includes annular rib 32 located on side 22 between conical end wall 20 and mounting flange 16, and annular rib groove 34 on side 24 opposite annular rib 32. As a result of this configuration, the polymer ring may collapse radially as conical end wall 20 is deflected axially outwardly to a more radial orientation due to engagement of curved surface 30 by first seal lip 26 during insertion of polymer bearing seal into the bearing. Annular rib groove 34 facilitates this radial collapsing by narrowing. Annular rib 32 may be generally square, as shown, or may have a rounded configuration.

To further facilitate the radial collapsing, annular rib groove 34 may extend axially into the polymer ring a depth greater than the axial thickness of conical end wall 20 such that annular rib groove 34 penetrates annular rib 32, as shown. Optionally, annular groove 34 may be interrupted at a plurality of points 36, regularly spaced about the circumference of the polymer ring, such that annular rib 32 is stiffened and strengthened against radial collapse at points 36. Optional annular channel 38 may be provided on side 22 of the polymer ring to facilitate the radial collapsing and the flattening of conical end wall 20.

Second annular groove 40 may be provided between annular rib groove 34 such that the polymer ring may collapse radially between mounting flange 16 and annular rib 32. Mounting flange 16 may project axially outwardly and radially outwardly from side 22 to side 24, as shown, to provide a barb-like structure facilitating insertion of polymer bearing seal 10. Annular flange groove 42 may undercut such a mounting flange such that the mounting flange may collapse radially inwardly as a hinged flap.

Second annular seal lip 44 may be provided, extending from radially inward portion 28 of conical side wall 20 for engagement with bearing inner ring 14 at a point axially outward of curved surface 30 engaged by first seal lip 26. Second annular seal lip 44 may have an angled surface contacting a radial step, as shown.

First seal lip 26 may include an axial extension between radially inner portion 28 of side wall 20 and a rounded end surface, as shown. This forms a shape somewhat like a boot, with the toe portion providing first seal lip 26, the heel portion providing second seal lip 44, and the instep portion providing a lubricant space therebetween. Such a configuration, combined with the pivoting of conical end wall 20 during installation, provides a radially outward camming engagement of inner ring 14 by first seal lip 26. This engagement resists deflection of end wall 20 beyond a radial orientation and retaining end wall 20 in position between bearing outer ring 12 and bearing inner ring 14, keeping the seal from "blowing out" under pressure.

As illustrated in FIGS. 2 and 4, optional radial ribs 46 may be provided on polymer bearing seal 48 between end wall 20 and axially extending first seal lip 26 to serve as a gusset and provide additional stiffness and strength. Preferably, polymer bearing seal 10 is made of a thermoplastic elastomer with fiber reinforcement. One example of a suitable polymer is DuPont Hytrel, available from DuPont. Other polymers with suitable characteristics, including elasticity, may also be used with the present invention.

The present invention provides a polymer bearing seal that uses maximum interference of the seal outer diameter relative to the outer ring seal groove 18 to provide sufficient retention. A negatively-angled configuration 50 on mounting flange 16 of the outer diameter and coring, such as for example annular flange groove 42, beneath that configuration allow the seal to deflect radially inwardly until the seal has been pressed far enough to spring back to fully engage and fill the space of seal groove 18. The configuration of the seal, including the relief between the first and second seal lips, 26 and 44 respectively, provides for lip location changes due to manufacturing tolerances, temperature changes, aging and wear.

Having described the invention, what is claimed is:

1. A polymer bearing seal for insertion between an outer ring and an inner ring of a bearing, the seal comprising:

a polymer ring having a mounting flange along the polymer ring's outer circumference for mounting engagement with a seal groove of the outer ring of the bearing;

the polymer ring having an annular end wall extending radially inwardly and axially inwardly such that, prior to insertion of the seal into the bearing, the end wall provides a conically convex side to be directed toward an axial center of the bearing and a conically concave side to be directed away from the axial center of the bearing;

the polymer ring having an annular first seal lip projecting from a radially inner portion of the end wall for engagement with an annular radially outwardly curved surface of the inner ring of the bearing after insertion of the seal into the bearing;

the polymer ring having an annular rib located on the convex side between the end wall and the mounting flange, and an annular rib groove on the concave side opposite the annular rib, such that the polymer ring may collapse radially as the end wall is deflected axially outwardly from a conical orientation to a more radial orientation during insertion of the seal into the bearing.

2. The polymer bearing seal according to claim 1 wherein the end wall of the polymer ring has an axial thickness and the annular rib groove has a depth greater than the axial thickness of the end wall of the polymer ring and penetrates the annular rib.

3. The polymer bearing seal according to claim 1 wherein the polymer ring has a second annular groove between the rib groove and the mounting flange such that the polymer ring may collapse radially inwardly adjacent to the mounting flange.

4. The polymer bearing seal according to claim 3 wherein the annular rib groove is interrupted at a plurality of points along the circumference of the annular rib groove such that the annular rib is strengthened against radial collapse at those points.

5. The polymer bearing seal according to claim 1 wherein the polymer ring has a second annular seal lip for engagement with the bearing inner ring axially outward of the annular radially outwardly directed curved surface of the inner ring engaged by the first seal lip.

6. The polymer bearing seal according to claim 1 wherein the end wall includes an annular channel on the conically concave side of the polymer ring adjacent to the annular rib, thereby facilitating collapse radially between the mounting flange and the annular rib.

7. The polymer bearing seal according to claim 1 wherein the mounting flange projects axially outwardly and radially outwardly from the conically concave side to the conically convex side, and an annular flange groove undercuts the mounting flange from the conically convex side, such that the mounting flange may collapse radially inwardly.

8. The polymer bearing seal according to claim 1 wherein the polymer ring is made of an elastic polymer such that the collapsing of the polymer ring radially is an elastic deformation resulting in a sealing force exerted by the first seal lip against the annular radially outwardly curved surface of the inner ring.

9. The polymer bearing seal according to claim 1 wherein the seal lip extends axially inwardly from the radially inner portion of the end wall.

10. The polymer bearing seal according to claim 1 wherein the first seal lip includes an axially inwardly directed extension extending from the radially inner portion of the end wall such that camming engagement of the inner ring by the axial extension resists deflection of the end wall beyond a radial orientation.

11. The polymer bearing seal according to claim 1 wherein the polymer ring is made of a thermoplastic elastomer.

12. A sealed bearing having an axis and comprising:

an outer ring having a seal groove;

an inner ring having an annular radially outwardly directed curved surface; and a seal comprising:

a polymer ring having a mounting flange along the polymer ring's outer circumference resiliently engaging the seal groove of the outer ring with an interference fit;

the polymer ring having an as molded condition, prior to insertion into the bearing, with an annular end wall extending radially inwardly and axially inwardly to provide a conically convex side directed toward an axial center of the bearing and a conically concave side directed away from the axial center of the bearing;

the polymer ring having an annular first seal lip projecting from a radially inner portion of the end wall into engagement with the annular radially outwardly directed curved surface of the inner ring of the bearing;

the polymer ring having an as molded condition with an annular rib located on the convex side between the end wall and the mounting flange, and an annular rib groove on the concave side opposite the annular rib;

the polymer ring being resiliently collapsed radially by engagement with a radially outwardly curved surface of the inner ring such that the annular rib groove is narrowed and the end wall of the polymer ring is deflected from a conical configuration to a more radial configuration during insertion of the seal into the bearing.

13. The sealed bearing according to claim 12 wherein the end wall of the polymer ring has an axial thickness and the annular rib groove has a depth greater than the axial thickness of the end wall of the polymer ring and penetrates the annular rib.

14. The sealed bearing according to claim 12 wherein the polymer ring has a second annular groove between the rib groove and the mounting flange such that the polymer ring may collapse radially inwardly adjacent to the mounting flange.

15. The sealed bearing according to claim 12 wherein the annular groove is interrupted at a plurality of points along the circumference of the annular groove such that the annular rib is strengthened against radial collapse at those points.

16. The sealed bearing according to claim 12 wherein the polymer ring has a second annular seal lip for engagement with a surface of the bearing inner ring axially outward of the annular radially outwardly directed curved surface of the inner ring engaged by the first seal lip.

17. The sealed bearing according to claim 12 wherein the end wall includes an annular channel on the conically concave side of the polymer ring adjacent to the annular rib, thereby reducing the axial thickness of the end wall.

18. The sealed bearing according to claim 12 wherein the mounting flange projects axially outwardly and radially outwardly from the conically concave side to the conically convex side, and an annular flange groove undercuts the mounting flange from the conically convex side, such that the mounting flange may collapse radially inwardly.

19. The sealed bearing according to claim 12 wherein the polymer ring is made of an elastic polymer such that the collapsing of the polymer ring radially is an elastic deformation resulting in a sealing force exerted by the first seal lip against the annular radially outwardly curved surface of the inner ring.

20. The sealed bearing according to claim 12 wherein the polymer ring is made of a thermoplastic elastomer.

21. The sealed bearing according to claim 12 wherein the seal lip extends axially inwardly from the radially inner portion of the end wall.

22. The sealed bearing according to claim 12 wherein the first seal lip includes an axial extension between the radially inner portion of the end wall and the engaged annular radially outwardly curved surface of the inner ring of the bearing such that camming engagement of the inner ring by the axial extension resists deflection of the end wall beyond a radial orientation.

* * * * *